Nov. 13, 1934.                J. M. CHRISTMAN                1,980,382
SHOCK ABSORBER
Filed March 12, 1931
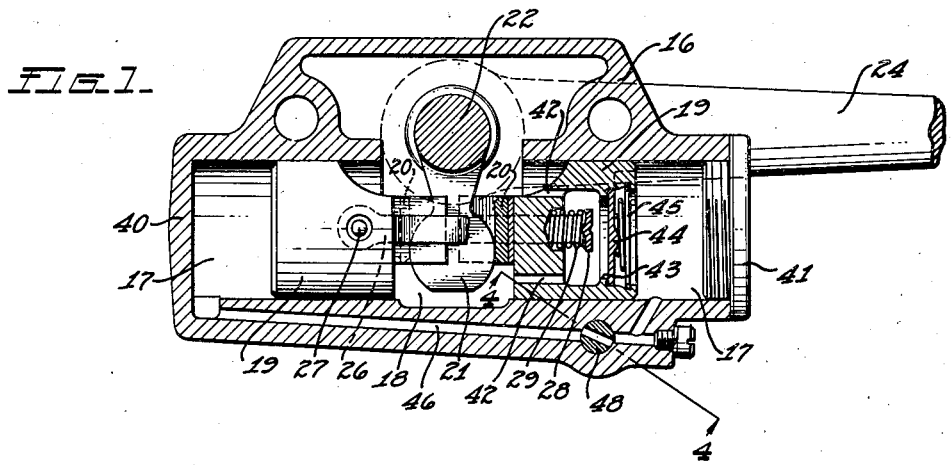
Fig. 1.
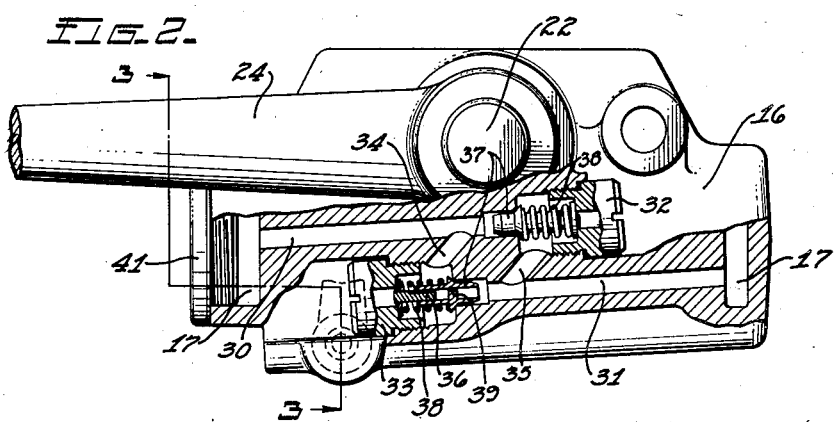
Fig. 2.
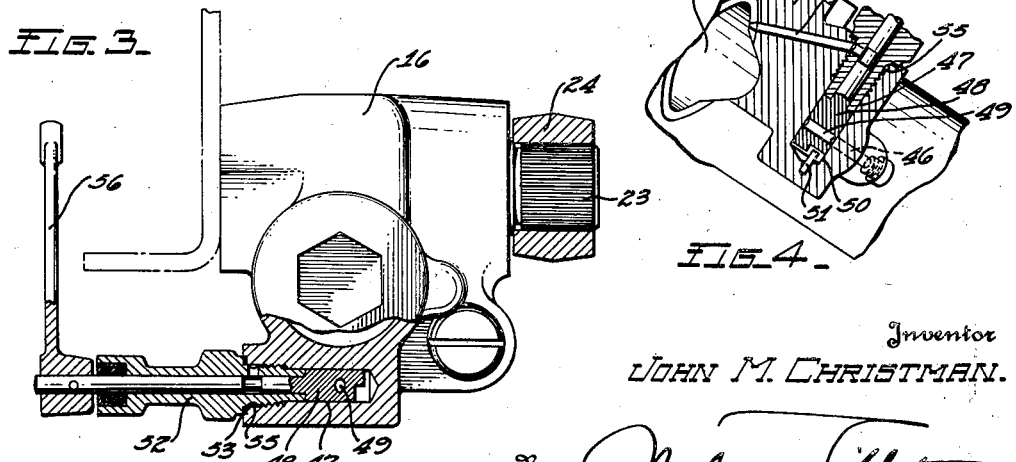
Fig. 3.
Fig. 4.
Inventor
JOHN M. CHRISTMAN.
By
Attorney Patented Nov. 13, 1934

1,980,382

UNITED STATES PATENT OFFICE 1,980,382

SHOCK ABSORBER

John M. Christman, Detroit, Mich., assignor to Packard Motor Car Company, Detroit, Mich., a corporation of Michigan Application March 12, 1931, Serial No. 522,024

5 Claims. (Cl. 188—88)

This invention relates to motor vehicles and more particularly to shock absorbers therefor.

It is a general object of the present invention to provide a novel and improved form of a shock absorber.

Another object of the invention is to provide a hydraulic shock absorber with regulating means for controlling the flow between two chambers which can be remotely controlled.

A further object of the invention is to provide a hydraulic vehicle shock absorber with mechanism for varying the fluid flow between working chambers which can be readily regulated.

Other objects of the invention will appear from the following description taken in connection with the drawing, which forms a part of this specification, and in which:

Fig. 1 is a longitudinal vertical sectional view taken through one of the shock absorbers, showing the passageway between piston chambers which is controlled from the dash;

Fig. 2 is a side elevational view of a shock absorber, broken away to illustrate the duct means connecting the piston chambers;

Fig. 3 is an end view of the shock absorber, taken on line 3—3 of Fig. 2;

Fig. 4 is a fragmentary sectional view of one of the shock absorbers taken on line 4—4 of Fig. 1.

The invention can be applied to various forms of shock absorbers, but in the particular embodiment of the invention illustrated, the absorbers are of the hydraulic type. The shock absorber is provided with a casing 16 having spaced cylindrical working chamber 17 formed therein and an intermediate chamber 18 which extends perpendicularly beyond the chamber 17 in enlarged form and provides a fluid reservoir. Pistons 19 are arranged within the chambers 17 and are each provided at their adjacent ends with a bearing pad 20 between which the head of a lever 21 is arranged. This lever extends perpendicularly from and is secured to a shaft 22 which extends into the enlarged portion of the reservoir and through a wall of the absorber casing. The shaft is provided with a serrated portion 23 at its outer end upon which is fixed an arm 24, such arm and the casing being attached to relatively movable elements. Relative movement of the elements to which the shock absorber is attached will rock the arm 24 which will impart rotation to the shaft 22 and, through means of the lever 21, will cause the pistons to reciprocate in the chambers 17.

The pistons are preferably tied together in a relation such that the bearing plates 20 will engage at all times with the head portion of the associated arm 21. To this end a connecting yoke 26 is provided and the free ends thereof extend into one of the pistons 19 and are pivotally secured by a pin 27. The saddle portion 28 of the connector is arranged within a hollow portion of the other piston and a coil spring 29 is associated with the piston and the saddle to urge the pistons toward each other. The pistons are slotted to receive the arms of the yoke and such arms extend in spaced relation on opposite sides of the bearing members 20 and across the reservoir chamber intermediate the chambers 17.

At one side of the piston chambers there is formed a longitudinally extending passage 30 which communicates at one end with one of the piston or working chambers and extending parallel therewith in the casing is another passage 31 which communicates at one end with the other piston or working chamber. A closure cap 32 is screwed into the open end of the passage 30, while another similar closure cap 33 is screwed into the open end of the passage 31. Connecting the passage 30 with the enlarged end of the passage 31 is a port 34 and connecting the passage 31 with the enlarged end of the passage 30 is a port 35.

A pair of telescoping slidably related valve members 36 and 37 are arranged in the enlarged end of the passages 30 and 31 and a coil spring 38 is associated with the two valve members to urge them apart and in a relation closing the passages intermediate the ports 34 and 35. The outer valve closure member 37 is hollow and is formed with a transversely extending wall portion 39 through which a small port extends and the valve member 36 is formed with a groove which extends beyond the end of the valve member 37 when it is seated so that a very restricted flow of fluid can pass interiorly of the valve between the passages 30 and 31 even when the valve is seated. When the pressure of the fluid flowing toward the valve in either of the passages 30 or 31 overcomes the tension of the springs 38, then the valve member 37 therein will be unseated permitting a larger flow of fluid between the passages.

Ordinarily the spring associated with the valve in the passage 30 has a lesser tension than the spring associated with the valve in the passage 31 and the springs are so formed because it is more desirable to provide a greater restriction to the flow between the piston chambers during the rebound stroke of the pistons than during the compression stroke. The fluid is compressed in the chamber having one end closed by the wall 41 during the compression stroke so that the flow of fluid will be through the passage 30, the port 35 and the passage 31 to the chamber 17 closed by the end 40. During the rebound stroke fluid is compressed in the chamber 17 closed by the end wall 40 and travels therefrom through the passage 31, the port 34 and the passage 30 into the other working chambers.

The pistons are formed with a hollow working end and ports 42 extend axially through the base portion of the pistons and establish communication between the reservoir chamber 18 and the hollow working ends thereof. Each of the pistons is formed with a seat 43 against which a disk valve 44 is normally maintained seated by a coil spring 45. During the compression stroke of one piston there will be a vacuum created in the chamber housing of the other piston, whereupon the suction will lift the disk valve from its seat and allow fluid from the reservoir chamber to be drawn thereby so that the chamber under vacuum will be filled with fluid during the compression stroke in the other chamber.

As before stated, the springs 38 in each shock absorber are preferably under different tension, however they can be of any desired tension and they can be readily removed so that springs of different tension can be utilized, if desired. Ordinarily, these spring tensions are of the character described and it is necessary that each be removed individually and another spring substituted if there is to be any variance in the resistance offered by the valves to the movement of fluid between the working chambers through the passages 30 and 31. This adjustment or any adjustment of this character, wherein the valve must be individually adjusted, requires a considerable effort and time and is usually quite unsatisfactory because road conditions are so variable that individual adjustment of the shock absorber on a motor vehicle is impossible if the desired riding qualities are to be obtained without stopping.

In order to adjust the shock absorber I provide a passage 46 in the absorber casing which communicates with the working chambers, and extending transversely of such passage I provide a recess 47 which extends to the exterior of the casing and is adapted to receive a rotatable valve 48. This valve is formed with a transversely extending port 49 which is adapted to register with the passage 46 when turned in a proper relation, and consequently rotation of the valve will cut off the flow of fluid through the passage 46 or it will permit flow in accordance with any degree of its open relation with the passage 46. In order to limit the rotation of the valve it is provided with a recess, indicated at 50, into which a pin 51 extends, as shown in Fig. 4. The valve is held in the recess 47 by a spacer or bearing member 52 which is screwed into the casing in a relation compressing the gasket 53 and in order to relieve the pressure on this gasket, I provide a port 54 which establishes communication between the circular groove 55 around the spacer and the reservoir chamber 18.

The valve 48 can be adjusted or it can be operated simultaneously with valves in other shock absorbers by suitable mechanism extending remotely therefrom. With the shock absorber shown there is a control arm 56 fixed to the extending end of each valve member, and such arm can be actuated to control the position of the valve 48. When the valve 48 is open fluid is free to flow through the passage 46 from one working chamber to the other and due to this additional relief passageway between the working chambers, the resistance to the compression stroke of the pistons is lessened so that a softer ride will result than would be had if the passage 46 and the valve 48 were not associated with the shock absorber. Adjustment of the valve 48 restricts the passageway and provides a range in which the resistance to the compression stroke of the pistons can be varied so that different degrees of resistance can be set up to oppose the compression strokes of the pistons in the shock absorber.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a hydraulic shock absorber, a casing formed with spaced working chambers and a pair of separate passages connecting the remote ends of the working chambers, pistons in the working chambers, means for reciprocating said pistons as a unit including a shaft extending through the casing, pressure responsive valves in one of said passages normally allowing a limited flow of fluid thereby, a rotatable valve extending into the casing and controlling fluid flow through the other passage connecting the working chambers, means for regulating the position of said rotatable valve in relation to the passage, and means within the casing cooperating with said rotatable valve for restricting the rotational movement thereof.

2. In a hydraulic shock absorber, a casing formed with spaced working chambers and a pair of separate passages connecting the remote ends of the working chambers, pistons in the working chambers, means for reciprocating said pistons as a unit including a shaft extending through the casing, pressure responsive valves in one of said passages normally allowing a limited flow of fluid thereby, a rotatable valve extending into the casing for controlling fluid flow through the other passage connecting the working chambers, a bearing member telescoping a portion of said rotatable valve, said bearing member being screwed into the casing in a leak-proof relation, and means arranged exteriorly of the bearing member and fixed to the rotatable valve for regulating the same.

3. In a hydraulic shock absorber, a casing formed with spaced working chambers and a pair of separate passages connecting the remote ends of the working chambers, pistons in the working chambers, means for reciprocating said pistons as a unit including a shaft extending through the casing, pressure responsive valves in one of said passages normally allowing a limited flow of fluid thereby, an extension bearing member screwed into the casing, a valve member extending through the bearing member and having its inner end traversing the other passage connecting the working chambers, said valve member having a passage therethrough adapted to register with the passage it traverses, and control means associated with said valve member exteriorly of said extension bearing.

4. In a hydraulic shock absorber, a casing formed with spaced working chambers and an intermediate reservoir chamber, said casing having a pair of separate passages formed therein connecting the remote ends of the working chambers, pistons in the working chambers, means for reciprocating said pistons as a unit including a shaft extending through the casing, pressure responsive valves in one of said passages normally allowing a limited flow of fluid thereby, a bearing extending into the casing, a gasket intermediate a portion of the bearing and the wall of the casing, the portion of said bearing extending into the casing having a circular groove adjacent the portion engaging the wall of the casing, said casing being formed with a passage connecting the circular groove with the reservoir chamber, and a valve member extending through the bearing and traversing the other of said passages connecting the working chambers, said valve member having a passage therethrough adapted to communicate with the passage which it traverses, and means for rotating said valve member to place the passage therethrough into or out of registration with the passage establishing communication between the working chambers.

5. In a hydraulic shock absorber, a casing formed with spaced working chambers and a pair of separate passages connecting the remote ends of the working chambers, pistons in the working chambers, means for reciprocating said pistons as a unit including a shaft extending through the casing, pressure responsive valves in one of said passages normally allowing a limited flow of fluid thereby, a rotatable valve extending into the casing for controlling the fluid flow through the other passage connecting the working chambers, said valve having a passage therethrough adapted to register with the passage which it traverses and a recessed end, a pin in the casing extending into the recess in the end of said rotatable valve and limiting the rotation thereof, and means for rotating said rotatable valve.

JOHN M. CHRISTMAN.